United States Patent [19]

d'Alayer de Costemore d'Arc

[11] Patent Number: 4,752,920

[45] Date of Patent: Jun. 21, 1988

[54] VARIETY MODE SELECTION DEVICE AND PROCESS FOR AUTOMATIC CHANGER APPARATUS

[75] Inventor: Stéphane M. A. d'Alayer de Costemore d'Arc, Genappe, Belgium

[73] Assignee: Staar S.A., Brussels, Belgium

[21] Appl. No.: 924,019

[22] Filed: Oct. 28, 1986

[30] Foreign Application Priority Data

Nov. 29, 1985 [BE] Belgium .................... 0/215.931

[51] Int. Cl.$^4$ .................. G11B 17/22; G11B 17/30; G11B 17/26

[52] U.S. Cl. .................. 369/33; 369/34; 369/38; 369/39

[58] Field of Search .............. 369/36, 37, 39, 33, 369/34

[56] References Cited

U.S. PATENT DOCUMENTS 4,567,584  1/1986  Kawakami .................. 369/36
4,580,254  4/1986  Hojyo et al. .................. 369/39

OTHER PUBLICATIONS

NCD-600 Programmable Compact Digital Disc Changer, Sales Brochure from Nikko.

Model DN-1102f Automatic Multiple CD Player, Sales Brochure from Nippon Columbia Co.
Technical Manual for JP-K6800.

*Primary Examiner*—Steven L. Stephan
*Attorney, Agent, or Firm*—Leydig, Voit & Mayer

[57] ABSTRACT

An automatic changer apparatus having a control system permitting the successive and/or selective playback of a plurality of record carriers having memory for storing a user-selected command value representing, for a record carrier, a total number of individual recorded pieces for playback, control devices included in the control system operative under program control for starting the playback of a first record carrier and playing back recorded pieces on the record carrier, and said control devices connected to said memory to receive the command value, and responsive thereto, to direct the automatic changer apparatus through a "variety" mode of operation including changing the first for a second record carrier when the registered number of recorded pieces played back from the first record carrier reaches the user-selected value, and repeating the starting and changing steps until all or a selection of the plurality of record carriers have been played back.

11 Claims, 2 Drawing Sheets

VARIETY MODE SELECTION DEVICE AND PROCESS FOR AUTOMATIC CHANGER APPARATUS

TECHNICAL FIELD

The present invention relates to a selection device and process for an automatic changer apparatus and, more particularly, to a selection device and process for controlling an automatic changer apparatus having a control system permitting the successive and/or selective playback of recorded carriers.

BACKGROUND ART

Generally, an automatic changer apparatus comprises a reproduction, i.e., read, apparatus, for playback of recorded pieces carried on various carriers, such as cassettes or discs, contained in a magazine and a loading and transfer mechanism for the selection and positioning of the recorded carriers relative to the reproduction device, enabling playback of the various carriers contained in the magazine.

Electrical and/or electronic commands allow the programming of the order of playback of the various carriers and possibly the order of playback of the various recorded pieces or parts carried by each carrier.

Generally, the recorded carriers and more particularly the compact discs with digital read out have pieces recorded by one artist. Accordingly, continuous or selective playback of such recorded carriers in a changer becomes tiresome for one must listen to ten or twelve songs or recorded pieces of music of the same artist before the changer goes on to the next selected disc for reproducing a roughly equivalent number of pieces of another artist. To remedy this drawback, it has been proposed to have, in addition to commands allowing selection of the disc playback order, commands allowing selection of the pieces which one wishes to hear on each disc, but previous attempts to accomplish this have not been found satisfactory.

In fact, in addition to the fact that a user is required to know or to remember the various pieces on the various discs contained in the automatic changer magazine, the user also has to perfectly recall the sequence in which the automatic changer must be programmed. As may be seen, with the exception of knowledgeable technicians, it is unlikely that a user would succeed in using such programming and safety precludes use of such equipment mounted in motor vehicles.

DISCLOSURE OF THE INVENTION

The object of the present invention is to remedy the above drawbacks by using a simple, easy to install selection device and process for controlling an automatic changer apparatus which does not require any special attention or knowledge by the user and which permits the user to modify the normal selection process by which the order of playback of discs or other recorded carriers is prescribed by selecting a "variety" program according to which a selected number (less than all) of the individual recorded pieces on a disc or other carrier are played back. The disc is changed automatically, and the same selected number of recorded pieces on the next disc are then played back, the selection device and process of this invention also permitting the user to change the selected number of pieces to be played back as desired.

With a view to achieving these objectives, the process according to the present invention involves the steps of storing a selected command value representing a total number of individual recorded pieces for playback, playing back the selected command value number of the recorded pieces on a first record carrier, and changing the record carrier when the count of recorded pieces played back reaches the selected command value number. Further, according to the invention, after the selected command value number on all the record carriers in the magazine have been played back, playback of the first record carrier is restarted to play the selected command value number of pieces from the remaining unplayed pieces on the first record carrier, the record carrier is then changed, and all the other record carriers of the plurality are similarly played back In accordance with the invention, an apparatus is provided for electronically or mechanically storing the command value in memory, and for allowing it to be modified by the user, and including a program for operating the control system to carry out the above described process.

BRIEF DESCRIPTION OF THE DRAWINGS

Further objects and advantages will be apparent from the following description, taken in conjunction with the accompanying drawings, in which.

BEST MODE FOR CARRYING OUT THE INVENTION

Figure 1:
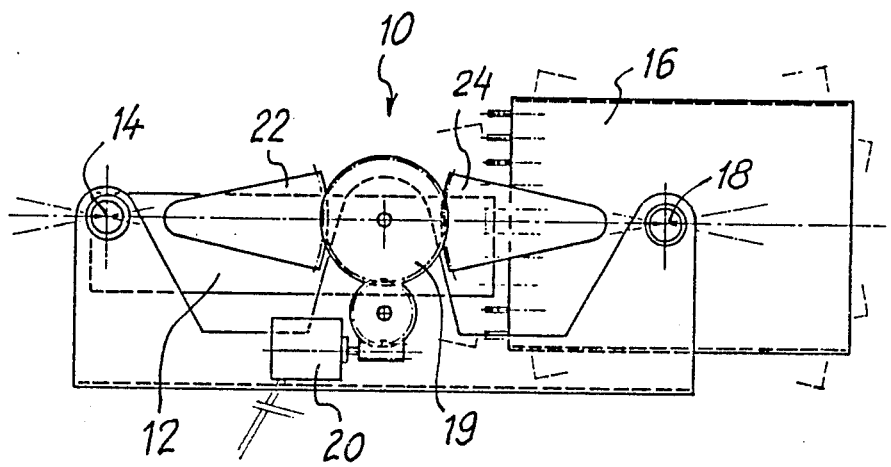
FIG. 1 represents a side view of an automatic changer apparatus of the type described in U.S. patent application Ser. No. 900,890, filed Aug. 27, 1986.

Referring to FIG. 1, an automatic changer apparatus 10 includes a loading/reproducing mechanism 12 mounted for pivoting about a horizontal pin 14, a magazine 16 having compartments for containing the recorded carriers, herein shown as discs, the magazine being mounted for pivoting about a horizontal pin 18, and a fixed frame 17 supporting the pins 14, 18 which are arranged on the fixed frame parallel to each other. Also supported on the frame 17 is a powered device for pivoting the mechanism 12 and magazine 16 to effect opposite angular displacement in a coordinated manner to position a compartment containing a selected disc opposite the loading/reproducing mechanism 12 so that the selected disc may be transferred to the loading/reproducing mechanism. The powered device includes a gear 19 controlled by a motor 20 and engaging with teeth of sectors 22, 24 respectively carried by the mechanism 12 and the magazine 16 such that, when the gear 19 is rotated, the opposite angular displacements of the mechanism 12 and magazine 16 are effected.

For further details as to the construction and operation of such equipment, reference may be made to the above-mentioned application Ser. No. 900,890.

Figure 2:
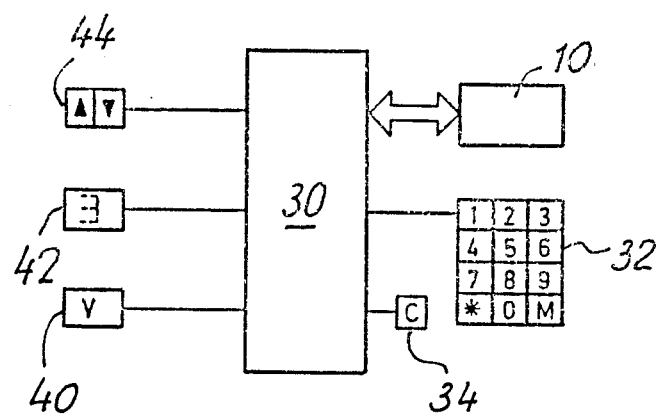
FIG. 2 represents a block diagram of a computerized control system for an automatic changer apparatus embodying the invention.

The control system shown in FIG. 2 includes a microprocessor 30 preprogrammed with instructions to provide the various functions of the automatic changer 10.

The microprocessor 30 receives commands from a keyboard 32, allowing the user to select one or a sequence of several discs, a button 34 providing, when selected, the "continuous" playback of all the discs contained in the magazine compartments.

These commands, termed "conventional", are found on most automatic changer equipment and will, therefore, not be given in detail.

Figure 3:
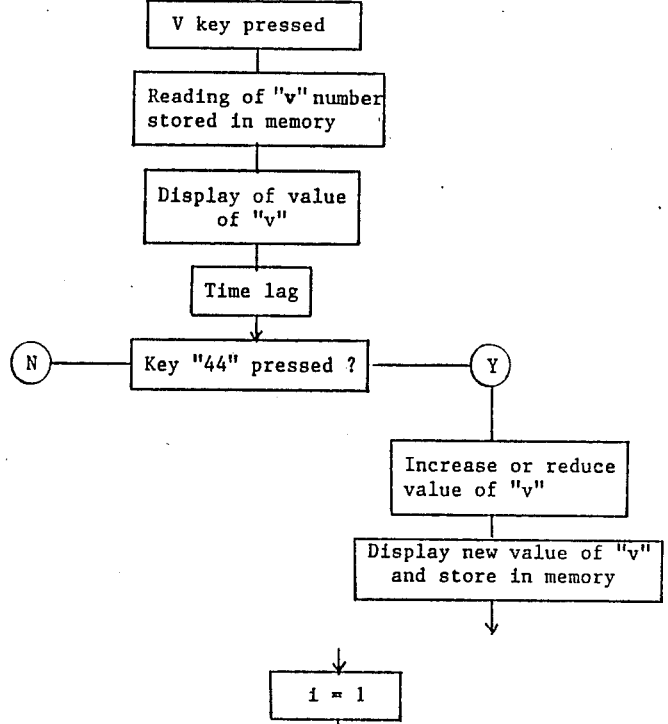
FIGS. 3 and 4 are flow diagrams of a program for the control apparatus embodying the process of the invention.

In accordance with the invention, by one of the keys of the keyboard 32, a command value "v" is stored in a storage means, such as a memory 40. The microprocessor 30 receives the "v" or "variety" command from the memory 40, which it recognizes as a mode change, causing the microprocessor 30 to select a sub-routine providing, as shown in FIG. 3, the reading from the memory 40 and, thereafter, the display, by means of a digital display 42, of the command value "v" representing, for a record carrier, a total number of individual recorded pieces for playback when the automatic changer operates.

A time lag allows the user, by means of the conventional key 44 of the keyboard, to increase or reduce this value "v" stored in memory 40. The new value thus set by the user is then displayed and stored up to the next modification, if any.

Figure 4:
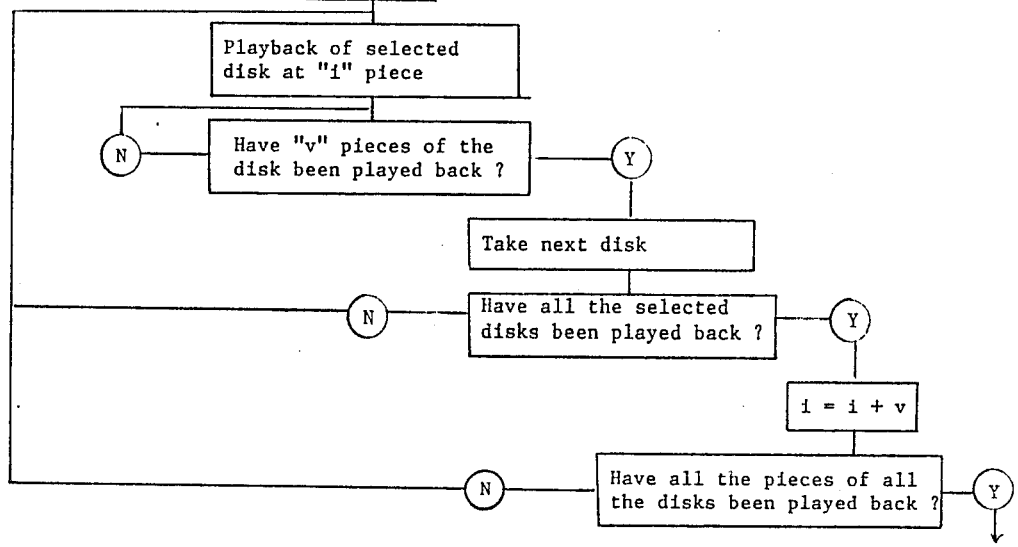

When the automatic changer is operated, the playback mode then provides, as shown in FIG. 4, playback of the total number of pieces of music represented by the selected command value "v" on the first disc. When the registered number of recorded pieces played back reaches the selected command value number "v", the microprocessor 30 automatically commands the selection of the second disc (either continuously or in accordance with an order preestablished by the user) and also directs the playback of the same selected command value number "v" of recorded pieces on the second disc. The disc is then changed and all the record carriers in the magazine are played back simultaneously. When the playback of the total number "v" of recorded pieces of music of all the discs, either selected by the user or contained in the automatic changer, is finished, a counter i contained in the microprocessor 30 has its value incremented from 1 to (v+1) and the automatic changer restarts the playback process with the first disc. During the second playing operation, the playback starts from the (v+1)th recorded piece on the first disc to play the selected command value number "v" of recorded pieces from the remaining unplayed pieces on the first disc, the disc is then changed, and all the discs of those in the magazine (or in an order selected by the user) are similarly played back.

This invention thus provides an automatic sequence by which a selected number "v" of different pieces recorded on a disc are played, followed by operating the changer to change discs to transfer a new disc to the playing position, and then the same number "v" of pieces are played from the new disc, and so on through the entire stack of discs in the magazine. Thus, this "variety" program, when selected, changes the operation from single play, continuous, or selected sequence mode to a "variety" mode. By allowing the user to change the value "v", the user has the option of selecting the number of pieces to be played from each disc before the changer operates to transfer the next disc from the magazine to the playback mechanism.

It will be understood that conventional programming on compact discs (CDs) includes data identifying each of the recorded pieces on a disc such that the reproduction mechanism may detect each recorded piece from recorded data. It is also conventional on commercial discs and tapes to have silence intervals of substantial duration between recorded pieces, making it possible to detect the individual pieces on a record carrier as they are successively played back, using means well known in the art. Detecting the individual recorded pieces on a carrier by such means, a control system may be programmed to carry out a "variety" mode operation in accordance with this invention.

Thus, when for each disc the registered number of recorded pieces played back reaches the selected value "v" in memory, the automatic changer automatically changes discs.

Moreover, after having provided for playback of the selected number "v" pieces of all the discs, the automatic changer restarts the process and plays the same selected number "v" of pieces from the remaining unplayed pieces on all the discs, and thereafter the automatic changer either restarts the playback process until all the recorded pieces on all the discs have been played or stops.

Further, when for a selected disc (either by programming or in continuous mode) all recorded pieces have been played back and thus its end has been reached, the changer automatically cancels this disc from the disc selection (either by programming or in continuous mode) and selects the next disc in selection.

The selection device and process of this invention can advantageously be combined with the memory storage device for instantaneous position reading which is the subject of U.S. Pat. No. 4,527,265. Actually, in this case, as the "v" value is stored in a permanent memory, the playback sequence in "variety" mode can be restored from its stopping point in the event of interruption of automatic changer feed.

I claim:

1. A process for controlling an automatic changes apparatus havng a control system permitting the succesive and/or selective playback of recorded pieces on a plurality of record carriers, including the steps of:

storing pre-programmed variety mode instructions in a memory unit, storing in a memory unit a user-selected value representing, for a record carrier, a total number of individual recorded pieces for playback, executing the variety mode instructions by operating the apparatus to play back recorded pieces on the record carrier, registering the recorded pieces as they are successively played back, changing the first for a second record carrier when the registered number of recorded pieces played back from the first record carrier reaches the user-selected value, and repeating the operating and changing steps until all or a selection of the plurality of reocrd carriers have been played back.

2. A process according to claim 1 including the further steps of modifying the stored user-selected value in response to a user command.

3. A process according to claim 1 including the further step of displaying the user-selected value.

4. A process according to claim 2 including the further step of displaying the user-selected value and the modified user-selected value.

5. A process according to claim 1 including the additional steps, after playback of all or a selection of the plurality of record carriers, of:

incrementing the stored user-selected value by 1, starting the playback of the first record carrier with the recorded piece represented by the user-selected value plus 1, changing the first for a second record carrier when the registered recorded pieces played back from the first record carrier reaches the selected value, and repeating the starting and changing steps until all remaining unplayed recorded pieces have been played back on all or a selection of the plurality of record carriers.

6. In an automatic changer apparatus having a control system permitting the successive and/or selective playback of a plurality of record carriers, the improvement comprising:

memory means for storing a user-selected command value representing, for a record carrier, a total number of individual recorded pieces for playback, means included in the control system for operating the apparatus to play back recorded pieces on the record carrier, pre-programmed controlled means for directing the apparatus through a variety mode of operation including means for registering the count of recorded pieces as playback occurs, means connected to said memory means to receive the command value, means connected to said registering means to receive the count of recorded pieces which have been played back, means for determining when the registered count reaches the command value and responsive thereto, for changing the first for a second record carrier when the registered number of recorded pieces played back from the first record carrier reaches the user-selected value, and means for repeating the starting and changing steps until all or a selection of the plurality of record carriers have been played back.

7. The improvement according to claim 6 including a keyboard having keys for selecting a command value and for modifying the selected value.

8. The improvement according to claim 6 including a display displaying the user-selected command value.

9. The improvement according to claim 7 including a display displaying the user-selected command value and the modified value.

10. The improvement according to claim 6 including a second memory means for storing a value representing a starting place for a new playback cycle, and wherein said pre-programmed controlled means after playback of all or a selection of the plurality of record carriers, includes means for:

incrementing the user-selected value stored in the first-mentioned memory means by 1 and to store the incremented value in said second memory means, starting the playback of the first record carrier with the recorded piece represented by the incremented value in said second memory means, changing the first for a second record carrier when the registered recorded pieces played back from the first record carrier reaches the selected value stored in said first-mentioned memory means, and repeating the starting and changing steps until all remaining unplayed recorded pieces have been played back on all or a selection of the plurality of record carriers.

11. A process for controlling a player/recorder having an automatic changer apparatus and a control system permitting the successive and/or selective playback of recorded pieces on a plurality of record carriers, said control system having memory units for storing electrical signals representing number values and instructions, said process including the steps of:

storing in a memory unit instructions to direct the changer through a variety mode of operation, storing in a memory unit a user-selected value representing, for a record carrier, a total number of individual recorded pieces for playback, executing the variety mode instructions by:

(a) operating the palyer/recorder to play back recorded pieces on a record carrier, (b) registering successive recorded pieces on the first record carrier and storing in a memory unit number values representing the registered number of recorded pieces, (c) comparing the stored number of recorded pieces with the stored user-selected value, (d) operating the automatic changer apparatus to change the record carrier for a second record carrier when the comparison indicates that the registered number of recorded pieces played back from the first record reaches the user-selected value, and repeating steps (a), (b), and (c) until all or a selection of the plurality of record carriers have been played back.

* * * * *